(12) United States Patent
Silver et al.

(10) Patent No.: US 7,320,218 B2
(45) Date of Patent: Jan. 22, 2008

(54) METHOD AND SYSTEM FOR GENERATION OF POWER USING STIRLING ENGINE PRINCIPLES

(76) Inventors: Guy Silver, 1071 Lackawanna Ct., Sunnyvale, CA (US) 94087; Juinerong Wu, 1071 Lackawanna Ct., Sunnyvale, CA (US) 94087

( * ) Notice: Subject to any disclaimer, the term of this patent is extended or adjusted under 35 U.S.C. 154(b) by 0 days.

(21) Appl. No.: 11/054,057

(22) Filed: Feb. 9, 2005

(65) Prior Publication Data
US 2006/0075753 A1    Apr. 13, 2006

Related U.S. Application Data

(63) Continuation-in-part of application No. 10/963,274, filed on Oct. 12, 2004.

(51) Int. Cl.
*F01B 29/10* (2006.01)
(52) U.S. Cl. .............................. 60/517; 50/519; 50/524
(58) Field of Classification Search .................. 60/517, 60/519, 524
See application file for complete search history.

(56) References Cited

U.S. PATENT DOCUMENTS

| | | | |
|---|---|---|---|
| 2,597,249 A | 5/1952 | Kollsman | |
| 3,744,245 A * | 7/1973 | Kelly | 60/519 |
| 3,815,362 A * | 6/1974 | Kolbinger | 60/525 |
| 3,931,713 A | 1/1976 | Eskeli | |
| 4,107,944 A | 8/1978 | Eskeli | |
| 4,269,031 A | 5/1981 | Loskot | |
| 4,488,524 A | 12/1984 | Sugiura | |
| 5,751,069 A | 5/1998 | Rajashekara | |
| 6,195,992 B1 | 3/2001 | Nommensen | |
| 6,196,047 B1 | 3/2001 | Carnegie | |
| 6,701,708 B2 * | 3/2004 | Gross et al. | 60/517 |
| 6,752,595 B2 | 6/2004 | Murakami | |

* cited by examiner

*Primary Examiner*—Hoang Nguyen
(74) *Attorney, Agent, or Firm*—Edward C. Kwok; MacPherson Kwok Chen & Heid LLP

(57) ABSTRACT

A heat engine enclosing a chamber in housing has two zones maintained at different temperatures. The first zone receives heat energy from an external power source. The second zone is connected to the hot zone by two conduits, such that a fluid (e.g., air, water, or any other gas or liquid) filling the chamber can circulate between the two zones. The expansion of the fluid in the hot zone and the compression of the fluid in the cold zone drive the rotation of the housing to provide a power output. The fluid may be pressurized to enhance efficiency. A cooling fluid provided in a stationary reservoir maintains a preferred operating temperature difference between the hot zone and the cold zone. A heat storage structure containing a fluid with a high heat capacity may be provided as a heat reservoir.

111 Claims, 8 Drawing Sheets

METHOD AND SYSTEM FOR GENERATION OF POWER USING STIRLING ENGINE PRINCIPLES

CROSS REFERENCE TO RELATED APPLICATIONS

The present application is a continuation-in-part application of, and claims priority to, co-pending U.S. patent application ("Co-pending patent application"), Ser. No. 10/963,274, entitled "Method and System for Generation of Electrical and Mechanical Power using Stirling Engine Principles," filed on Oct. 12, 2004, bearing Attorney Docket No. M-15504 US. The Co-pending patent application is hereby incorporated by reference in its entirety.

BACKGROUND OF THE INVENTION

1. Field of the Invention

The present invention relates to applying Stirling engine principles to power conversion equipment design and use. In particular, the present invention relates to applying Stirling engine principles for power generation, such as generating mechanical-power.

2. Discussion of the Related Art

The Stirling engine is a heat engine that operates by converting the heat energy which flows between zones of different temperatures into useful work. A typical Stirling engine uses the heat energy to drive a coordinated and reciprocating motion of a set of pistons. The motion of the pistons drives machinery or a generator. Alternatively, heat engines having rotary motion are also known. Numerous designs of Stirling engines having rotary motion can be found in the prior art, including: U.S. Pat. Nos. 6,195,992, 3,984,981, and 5,325,671.

In the prior art, moving parts for the Stirling engine operation are enclosed in a housing and coupled mechanically (e.g., by an axle) to external parts to drive external machinery. High efficiency in such an arrangement requires that the housing be sealed in an airtight fashion. A seal failure leads to the failure of the engine.

SUMMARY

The present invention provides a method and a rotary engine based on Stirling engine principles. According to one embodiment of the present invention, the housing of the rotary engine rotates as a result of fluid flow between two zones of different temperatures within a chamber in the housing. The torque in the rotary motion of the housing, therefore, may be used to drive machinery (e.g., a generator) through an axle coupled externally to the housing. Under this arrangement, unlike the prior art, a rotary engine of the present invention is not susceptible to failure due to a leak in the sealing of the housing.

According to one embodiment of the present invention, the hot zone of the chamber is heated by energy from a heat source, and a cooling system maintains the cold zone at a lower temperature than the hot zone. The cooling fluid may be drawn from a stationary external reservoir of cooling fluid. In one embodiment, the rotary motion of the housing may be used to draw the cooling fluid. In that embodiment, the volume of cooling fluid drawn into the rotary engine depends on the angular speed of the rotary motion which, in turn, may be determined by power output of the rotary engine. A self-regulating cooling system may therefore be achieved. A structure used to reinforce the housing at the point where the external axle is to be attached may include a threaded passage. In that embodiment, the rotating threaded passage forces the cooling fluid into the housing, through passages distributed around the cold zone (e.g., the insulation layer abutting the cold zone, the fluid guide structure or the area between the cold zone and the housing) so as to maintain the cold zone to within a desired temperature range.

A turbine in a rotary engine according to the present invention may be located in any suitable location on the interior surface of the housing hot zone or the cold zone, but is coupled to the housing to provide the housing rotary motion and is not required to directly drive an axle to provide the output power of the rotary engine. The chamber of the rotary engine may be filled with a compressible working fluid (e.g., air). Fluid guides may be provided within the chamber for guiding the flow of the compressible working fluid in preferred directions and flow speeds to provide higher efficiency. The fluid guides may also provide structural or mechanical support for the chamber.

In one embodiment, a one-way valve may be provided between the hot zone and the cold zone prevents a working fluid in the hot zone to backflow into the cold zone.

In another embodiment, a metal mesh is provided in the hot zone to increase efficiency of heat transfer from the heat source to the hot zone. A heat storage structure can also be provided to minimize the impact of a fluctuating heat source on the power output of the rotary engine. A high specific heat capacity fluid can be used in the heat storage structure. In one embodiment, a conductive plate is urged by springs loaded to contact the hot zone after predetermined operation conditions (e.g., a predetermined temperature) are reached.

The present invention is better understood upon consideration of the detailed description below and the accompanying drawings.

BRIEF DESCRIPTION OF THE DRAWINGS

FIG. 4 is a top view of hot zone 110a underneath top plate 101a.

To facilitate cross-reference among the figures and to simplify the detailed description below, like elements in the figures are assigned like reference numerals.

DETAILED DESCRIPTION OF THE PREFERRED EMBODIMENTS

The present invention provides a heat engine that operates under Stirling engine principles to convert heat energy from a heat source into mechanical energy. The mechanical energy can be coupled to drive machinery and generators to perform useful work. Examples of a suitable heat source include solar, geothermal, fossil, landfill, recovered or other fuels.

Figure 1:
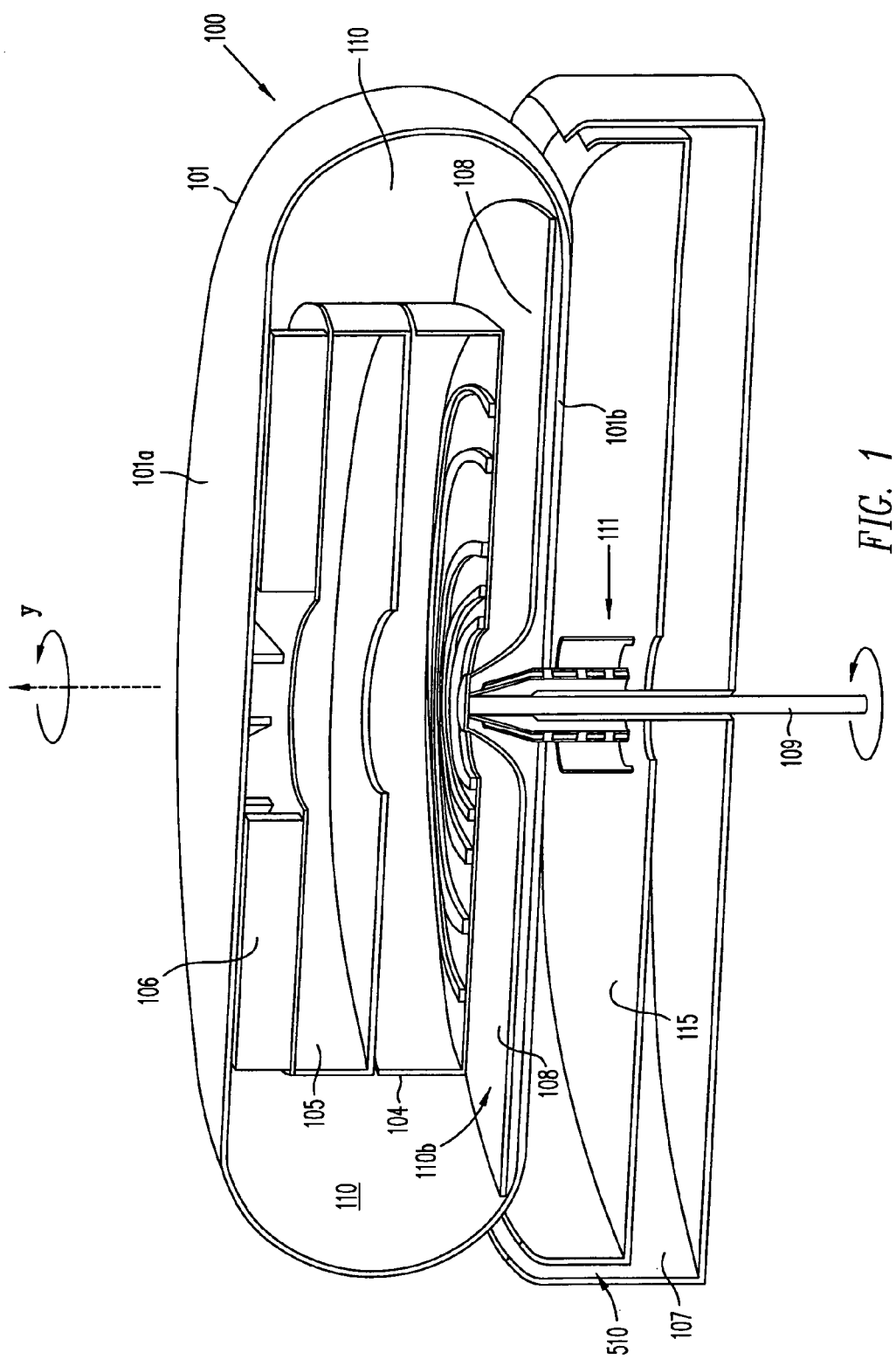
FIG. 1 shows a cross section view of heat engine 100 with cooling reservoir 107, in accordance with one embodiment of the present invention.

FIG. 1 shows a cross section view of heat engine 100, including cooling fluid reservoir 107, according to one embodiment of the present invention. As shown in FIG. 1, heat engine 100 includes a chamber 110 enclosed in an enclosure or housing 101. During operation, when a heat source is provided incident on top surface 101a of housing 101, a temperature difference exists between a "hot zone" 110a and a "cold zone" 110b within chamber 110. The present invention exploits this temperature difference to cause housing 101 to rotate about the axis indicated by "Y" in a manner described below. The rotary motion turns axle 109, which may be used to drive the motion of an external mechanical device. According to one embodiment of the present invention, axle 109 is partly ensheathed in rotary structure 111 and extends beyond cooling reservoir 107. Axle 109 is coupled with rotary structure 111 in rotational motion. Alternatively, axle 109 may also be connected to top plate 101a of housing 101.

In the embodiment shown in FIG. 1, a cooling mechanism is provided to maintain the temperature difference between hot zone 110a and cold zone 110b. This temperature difference drives the rotary motion of housing 101, thus providing output power. The cooling mechanism includes cooling reservoir 107 containing a cooling fluid, which is circulated between cooling reservoir 107, cold zone 110b, space 508 and insulator layer 104 to maintain or to increase the temperature difference between cold zone 110b and hot zone 110a. A reservoir cover 115 is provided between housing 101 and cooling reservoir 107 to prevent spilling and excessive evaporation of the cooling fluid. In this detailed description, the terms "hot" and "cold" are relative. Heat engine 100 will operate as long as there is a sufficient temperature difference between the hot zone 110a and the cold zone 110b.

Figure 2:
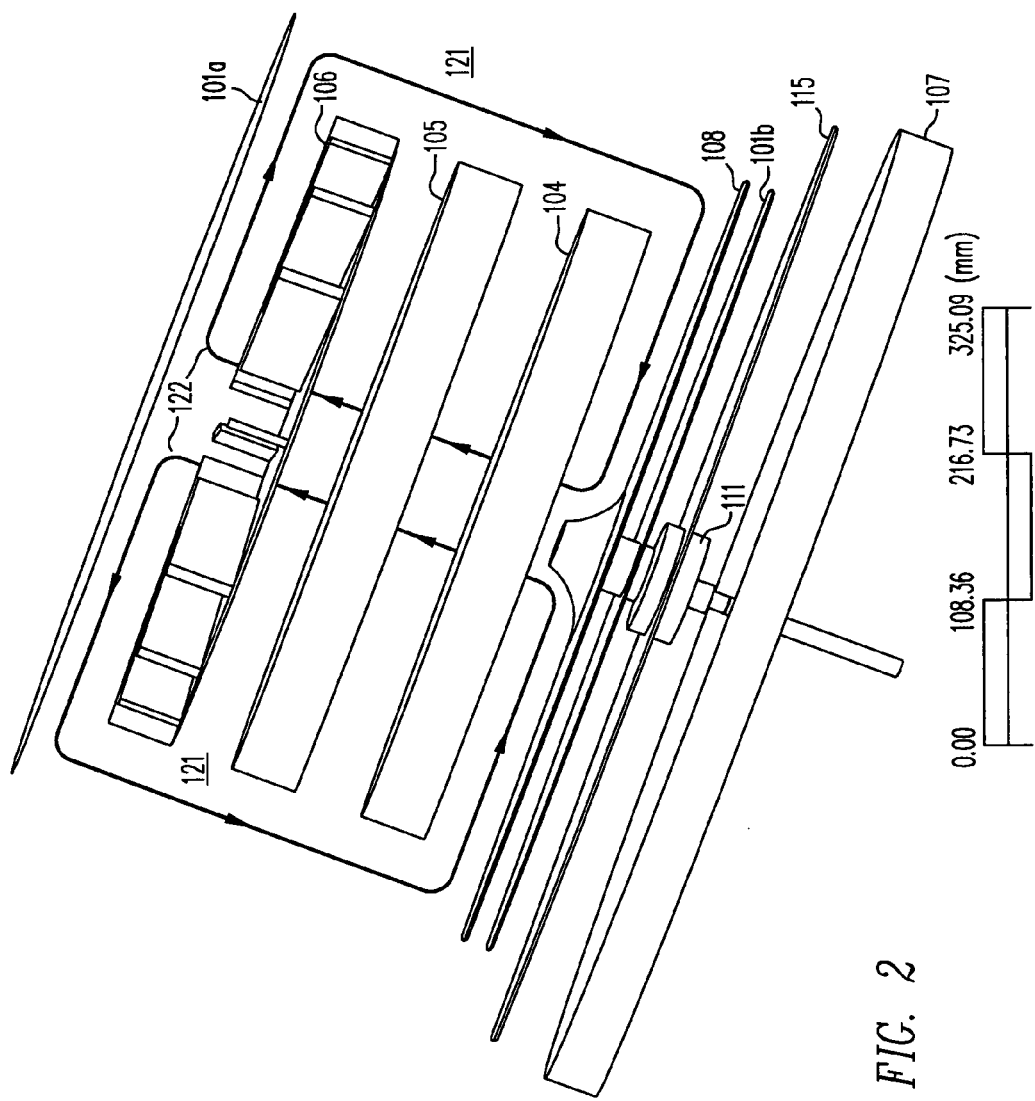
FIG. 2 shows heat engine 100 with cooling reservoir 107 in an isometric exploded side view.
Figure 3:
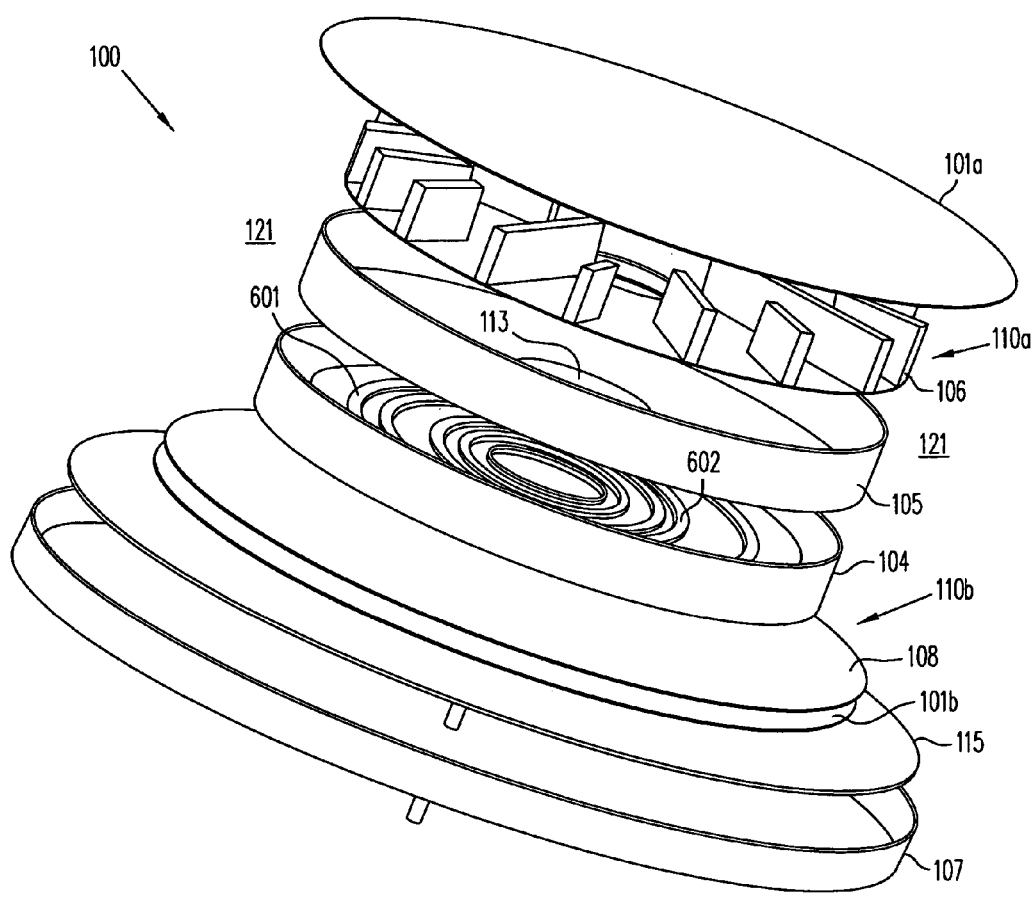
FIG. 3 shows heat engine 100 in a "blown-up" perspective view.

The elements enclosed within housing 101 is better illustrated in conjunction with FIGS. 2 and 3 which show, respectively, heat engine 100 in a "isometric exploded" side view and an "isometric exploded" perspective view. The outer side wall of housing 101 is omitted in FIGS. 2 and 3, so as to allow the internal construction of heat engine 100 within chamber 110 to be shown. As shown in FIGS. 1, 2 and 3, top plate 101a and bottom plate 101b are, respectively, the top outer wall and the bottom outer wall of housing 101. In this embodiment, a heat source (e.g., solar energy) is incident on top plate 101a. As described below, the cooling fluid of cooling reservoir 107 maintains the region between insulator layer 104 and bottom plate 101b to a lower temperature. The combined action of the heat source and the cooling fluid creates hot zone 110a and cold zone 110b, as indicated in FIGS. 1, 2 and 3. In this embodiment, the cold zone 110b is separated from bottom plate 101b by a disk 108, to create a space 508 between disk 108 and bottom plate 101b in which the cooling fluid may flow, so as to achieve temperature regulation. (In this description, the upper and lower portions of FIG. 2 are labeled "top" and "bottom", respectively, merely to facilitate reference in this detailed description. The operation of a heat engine of the present invention is not limited by its physical orientation.) In FIGS. 2 and 3, heat engine 100 is shown in "exploded" views in the sense that the separations between elements of heat engine 100 are exaggerated in the vertical direction for illustration purpose.

Hot zone 110a and cold zone 110b are insulated from each other by insulator layer 104, which is described in further detail below. Suitably placed support structures may be provided throughout hot zone 110a and cold zone 110b for mechanical support inside housing 101. Such support structures may include, for example, posts, stakes, beams and poles. Thermionic and thermocouple devices may be provided within insulator layer 104 as well. Such devices may be used to provide power output, as discussed in the Co-pending patent application incorporated by reference above. In this embodiment, a separator structure 105 is further interposed between hot zone 110a and insulator layer 104. Fluid flows between hot zone 110a and cold zone 110b through central open shaft 113 and space 121. Space 121 includes all space between fluid guide structure 106, separator structure 105, insulator layer 104, rotary structure 111, and outer wall of housing 101. Separator structure 105 is an optional storage structure, which is described in further detail below. Chamber 110 is filled with a compressible working fluid, which may be air, another fluid or a mixture of fluids to achieve desired fluid densities, and mechanical and thermal properties. The working fluid may be pressurized.

Heat engine 100 harvests the heat energy received by a turbine structure which may be located on the surface of the interior wall of housing 101. The turbine structure may be located at any suitable location where a torque can be generated for the desired rotary motion of housing 101. Such a location may include, for example, within space 121, hot zone 110a and cold zone 110b. The turbine structure may also be built into the interior wall of housing 101. The turbine structure may include one or more sets of fluid guides or blades, which are designed to guide the working fluid, to control the working fluid velocity and pressure, and to create the torque for the rotary motion, so as to extract the maximum surging power from the expansion and the compression of the working fluid. Each fluid guide preferably maintains a predetermined angle relative to the working fluid during rotation of housing 101. The turbine structure may be any suitable size or materials, depending on the application of the heat engine 100.

Figure 4:
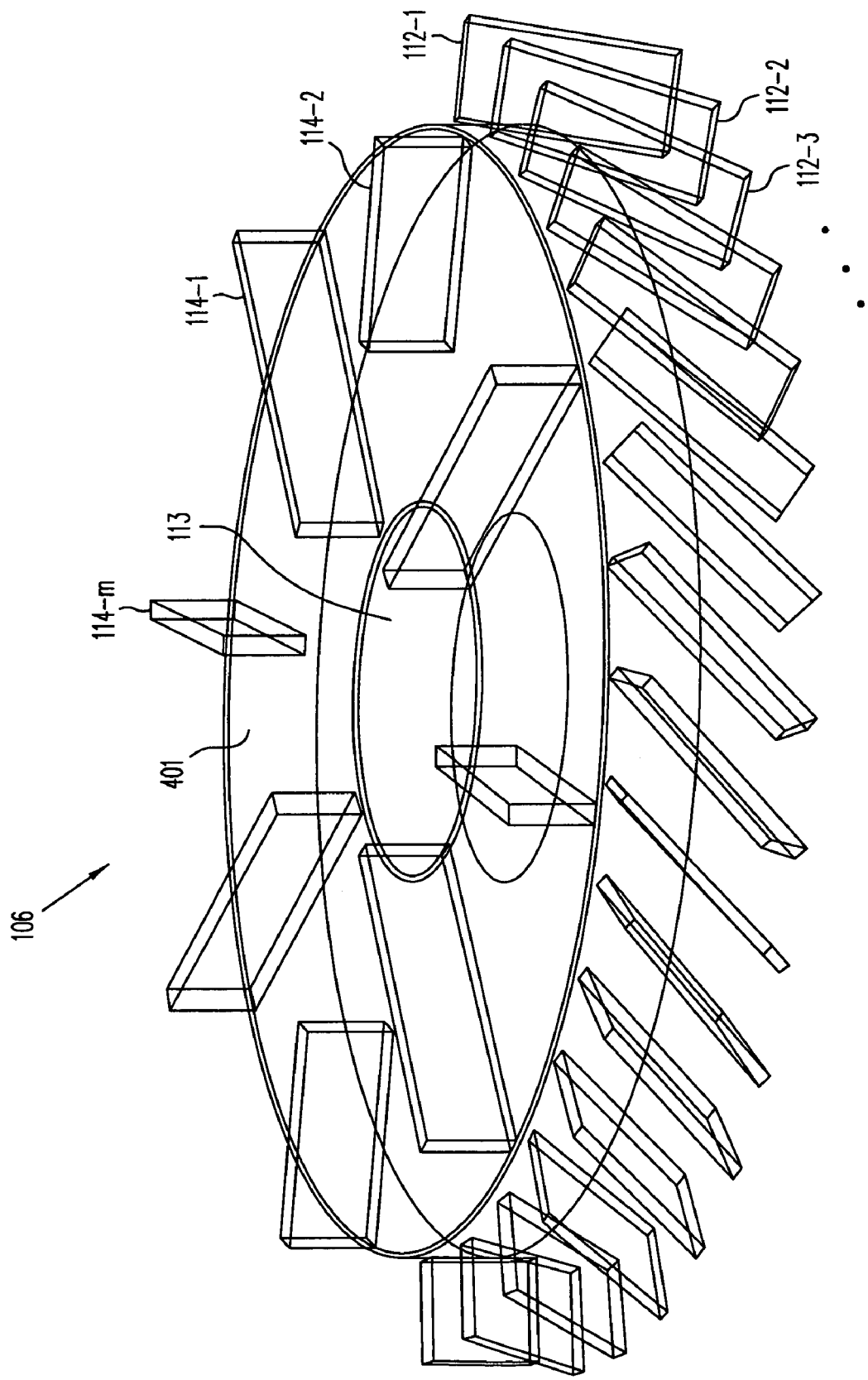

According to one embodiment of the present invention, heat engine 100 includes a turbine structure, referred herein as fluid guide structure 106, in hot zone 110a. FIG. 4 is a top view of hot zone 110a underneath top plate 101a. As shown in FIG. 4, heat engine 100 includes fluid guide structure 106, which includes plate 401, a first set of fluid guides 114 numbering from 114-1 to 114-m and a second set of fluid guides 112 numbering from 112-1 to 112-n, where n and m are integers. Fluid guides 112 and 114 are designed to work cooperatively and function as extra thermal transfer surfaces as a heat source or heat sink. Fluid guides 112 and 114 may be any suitable size or materials, depending on the application of the heat engine 100. Fluid guides 112-1 to 112-n are attached to housing 101 and are generally arranged around the periphery of plate 401. Fluid guides 112 may also be attached to plate 401. In one embodiment, each fluid guide is provided a rounded contour, such that one side of the fluid guide may have a larger cross-section than the other, thereby creating a torque that provides the rotary motion of housing 101. As discussed above, fluid guides 112-1 to 112-n are designed to maintain a predetermined angle relative to the working fluid flow direction in the immediate vicinity of each of fluid guides 112. During operation, as heat builds up in hot zone 110a, the expanding working fluid in hot zone 110a pushes against fluid guide set 112 to create a torque to cause housing 101 to rotate. The working fluid in hot zone 110a flows radially outwards from space above open shaft 113, and into cold zone 110b through annular space 121. One example of using fluid guides 112 of fluid guide structure 106 with an axle to form a turbine is disclosed in the Co-pending patent application incorporated by reference above. The torque created by the rotating fluid guide structure 106 is transmitted to the rotary structure 111 (and thus axle 109) through the outer wall of housing 101, such that housing 101 rotates integrally with fluid guide structure 106. The asymmetrical surface areas on each of fluid guides 112 are not necessary, but may provide some advantage in some application, such as ease in starting up with motion in a predetermined direction. Fluid guides 112 provide a large surface area for heat transfer. Thus, heat engine 100 has a high surface to volume ratio to enhance efficiency. Fluid guides 112-1 to 112-n can also be used as fluid guides to control the working fluid flow at a preferred angle, so as to maximize torque generation.

Fluid guides 114-1 to 114-m guide the working fluid in a preferred angle towards the fluid guides 112 to achieve a preferred rotational force. Fluid guides 114-1 to 114-m may be formed as support structure to provide support between top plate 101a and separator structure 105. Fluid guides 114-1 and 114-m are designed to accommodate the design of fluid guides 112. Although not shown in this embodiment, a similar fluid guide structure with corresponding sets of fluid guides may also be provided in cold zone 110b to shape the return path of the working fluid. Alternatively, the fluid guide structure in cold zone 110b may be provided in a different configuration (e.g., a different material, differently shaped fluid guides, performing different functions) to achieve different design objectives. Fluid guide 114-1 to 114-m may be shaped and used as blades to help the turbine structure creating torque for housing 101 to rotate in a predetermined direction. Fluid guide structure 106 may be considered as part of the turbine structure.

Figure 8:
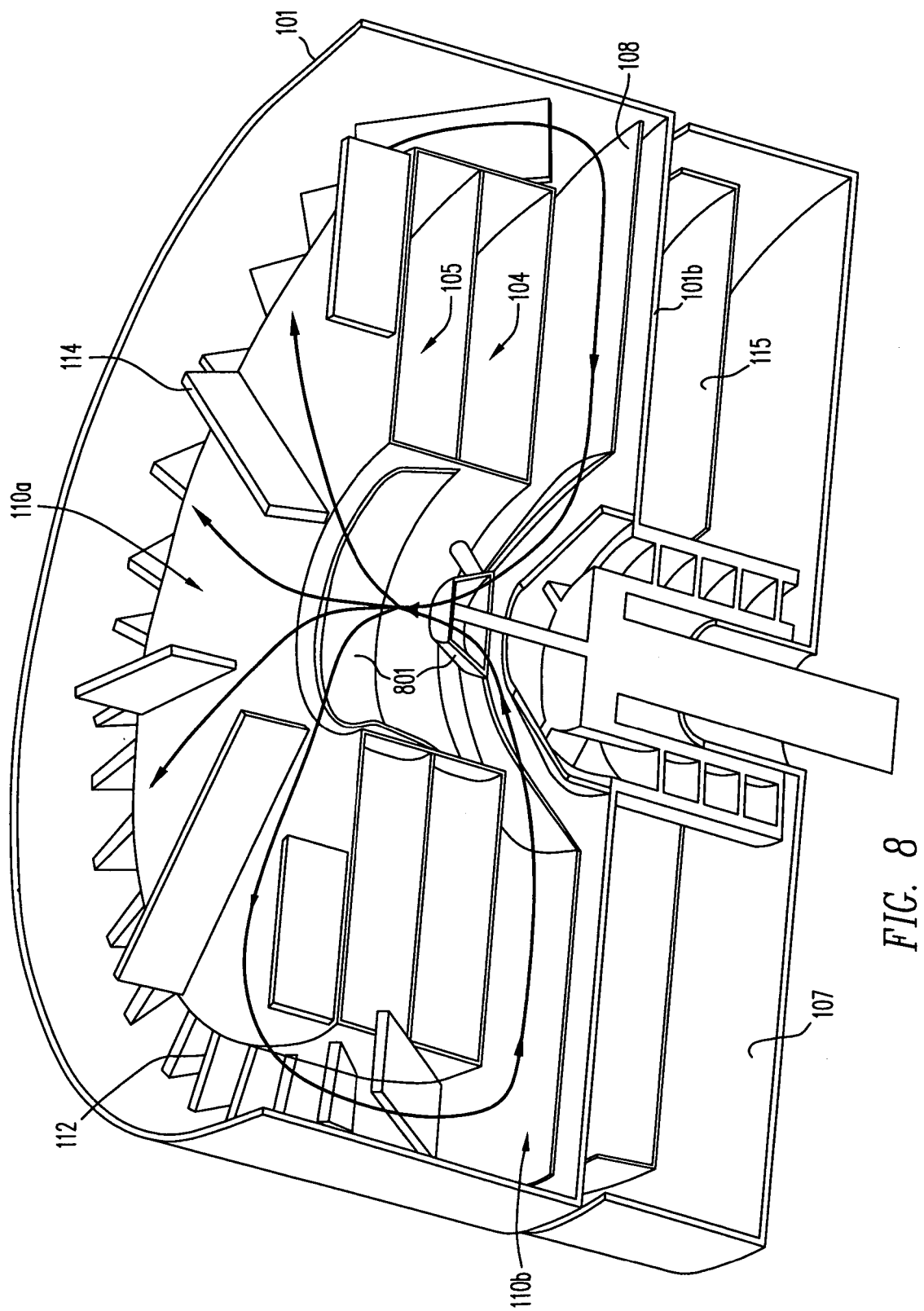
FIG. 8 is a cross section view showing the working fluid circulation paths in the interior of housing 101.

When a substantial temperature difference in temperature exists between hot zone 110a and cold zone 110b, a circulation of the working fluid, indicated by flow lines 122 in FIG. 1, is established. In this circulation, the working fluid flows radially outwards in hot zone 110a, enters cold zone 110b through space 121, flows radially inwards into cold zone 110b and returns to hot zone through open shaft 113. A heating mesh may be provided in hot zone 110b above the vicinity of open shaft 113, so as to increase the surface area over which the working fluid may be heated, thereby improving heating of working fluid efficiency. Heat may be concentrated and directed in hot zone 101a to the heating mesh. This heating mesh can also function as the contact point between external heat source and the heat reservoir 701 in separator structure 105. In this process, the relatively hot working fluid in hot zone 110a expands and flows into the cold zone 110b, where it is cooled and compressed. A one-way valve may be provided in open shaft 113 between hot zone 110a and cold zone 110b to prevent back flow of the working fluid from hot zone 110a into cold zone 110b. FIG. 8, which is a cross section view of heat engine 100, shows the working fluid circulation paths through fluid guide structure 106. As shown in FIG. 8, one-way valve 801 is provided in open shaft 113 between hot zone 110a and cold zone 110b to prevent back flow of the working fluid from hot zone 110a into cold zone 110b.

As can be seen from the above, the system of fluid guides in the embodiments described above perform multiple tasks. For example, each fluid guide may be structurally attached to one or more walls of fluid guide structure 106, rotary structure 111, insulator layer 104 and separator structure 105. Multiple channels, passages or conduits for the working fluid flow within housing 101 are formed. The structures of the fluid guides can be used to affect the mechanical parameters[1] of heat engine 100, such as the working fluid pressure, the directions and angles the working fluid flow and the magnitude of the torque causing the rotary motion. The design of the fluid guides therefore improves the power output of heat engine 100. Alternately, the fluid guides need not attach to any rotary structure 111, insulator layer 104 and separator structure 105. In this instance, multiple channels, passages or conduits for the working fluid flow are not formed. The resulting design is simpler, has a more even heat distribution and a lighter housing.

Figure 5:
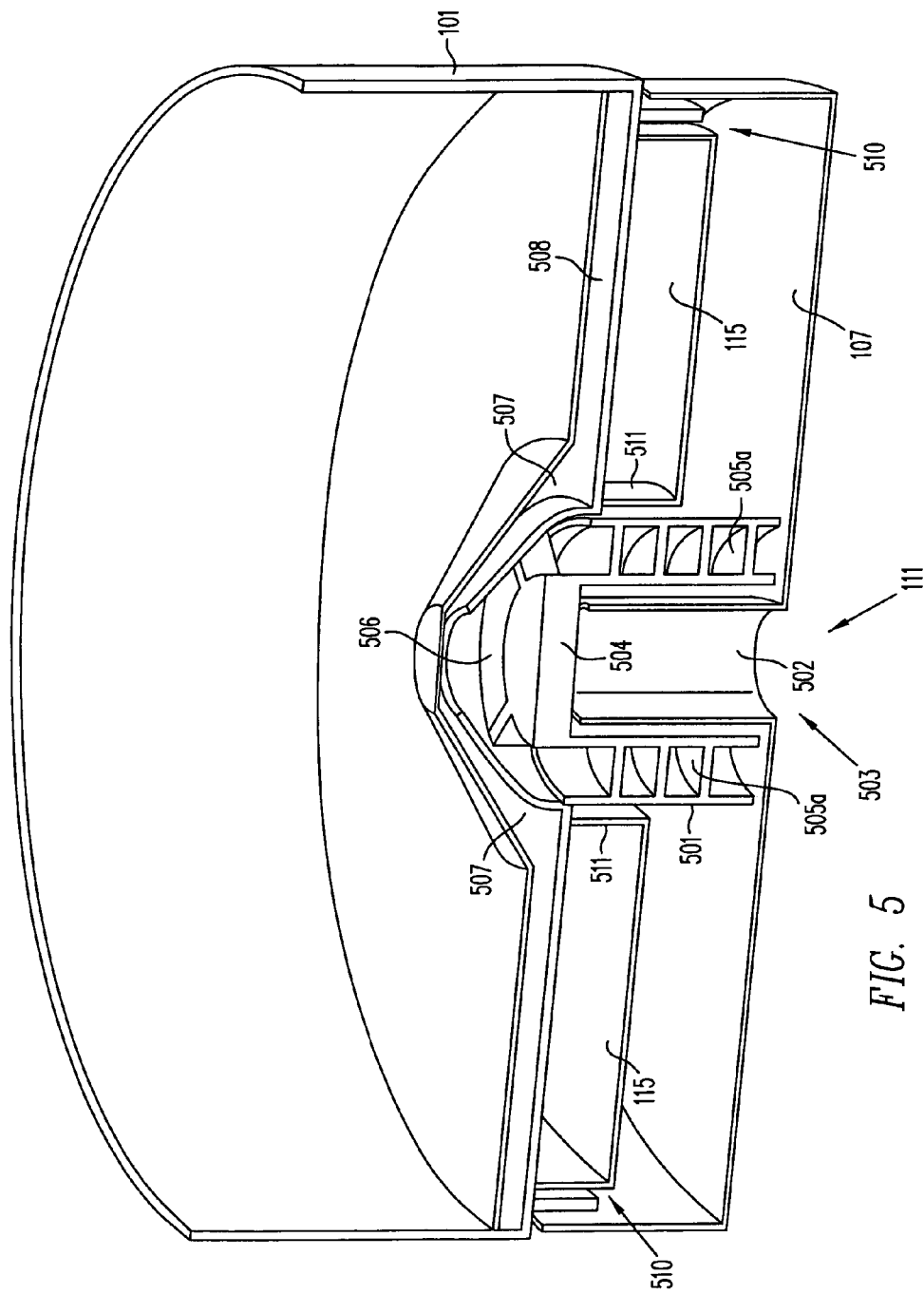
FIG. 5 shows rotary structure 111 of FIGS. 1 and 2 in greater detail.

Rotary structure 111 is located in the lower portion of open shaft 113 and supports the weight of housing 101, including the various elements of heat engine 100 housed within housing 101. Rotary structure 111 rotates with axle 109 by receiving the combined torque transmitted from all turbine structures or fluid guide structures within housing 101. As mentioned above, the operating temperature difference between hot zone 110a and cold zone 110b may be maintained by a cooling fluid. In the embodiment shown in FIGS. 1, 2 and 3, the cooling fluid is provided from stationary cooling reservoir 107. In this embodiment, rotary structure 111 facilitates the cooling fluid uptake. FIG. 5 shows rotary structure 111 of FIGS. 1 and 2 in greater detail. As shown in FIG. 5, rotary structure 111 has cylindrical outer wall 501, a portion of which is inserted into cooling reservoir 107 through a center opening of reservoir cover 115 and surrounds cylindrical inner wall 502 of cooling reservoir 107. Cylindrical inner wall 502 of cooling reservoir 107 may extend up to top wall 504 of rotary structure 111. Axle 109 may be attached to top wall 504 of rotary structure 111. Rotary structure 111 also serves to reinforce bottom plate 101b of housing 101 to allow it to bear the load of housing 101 and its included elements of heat engine 100. Axle 109 is designed to support rotary structure 111 and to transmit the rotary motion of housing 101 to the load being driven. Rotary structure 111 includes threaded passage 505a which opens into cooling reservoir 107. As rotary structure 111 rotates, it draws the cooling fluid up threaded passage 505a into a chamber 506, where the cooling fluid flows into space 507, which distribute the cooling fluid into spiral passages 601 and 602 (FIG. 3) provided in the bottom portion of insulator layer 104. The cooling fluid may also overflow into space 507, where it is guided into passages within space 508 which is located between bottom plate 101b of housing 101 and disk 108 at the bottom side of cold zone 110b. Both the spiral passages in insulator layer 104 and the passages space 508 under disk 108 returns the cooling fluid to cooling reservoir 107 through an outlet at cooling fluid capture 510. Support elements, such as post, walls or beams may be provided within space 508 to provide support and to channel fluid flow in any desired manner. Cooling fluid capture 510 may include an enclosed conduit for channeling the cooling fluid through reservoir cover 115. As housing 101 rotates, the cooling fluid is circulated to maintain the temperature of cold zone 110b without an external pump.

The structure of the cooling system, according to the embodiment shown in FIG. 5, therefore includes rotary structure 111, cooling reservoir 107, reservoir cover 115, cooling fluid capture 510, and heat sinks (not shown) which may be provided to dissipate heat from cooling reservoir 107. Cooling reservoir 107, reservoir cover 115 and cooling fluid capture 510 are stationary and can be supported by an external structure (not shown). Bearings may be provided where contact is made between housing 101 and the walls of cooling reservoir 107. For example, bearings maybe provided between bottom plate 101b of housing 101 and the side walls of cooling fluid capture 510, between cylindrical outer wall 501 and cylindrical wall 511 of reservoir cover 115, between top wall 504 of rotary structure 111 and cylindrical inner wall of 502 of cooling reservoir 107, and between cylindrical inner wall 502 of cooling reservoir 107 and the walls of recess 503 of rotary structure 111. The bearings may also be used mechanically support the weight of heat engine 100 and to provide stability during rotation. The bearings and the reservoir cover 115 prevent cooling fluid spill. Of course, an external structure, other than cooling reservoir 107, may be provided to mechanically support housing 101. In this embodiment of present invention, cooling fluid capture 510 may be enclosed by bearings. Other configurations for cooling fluid capture 510 are possible.

Figure 6:
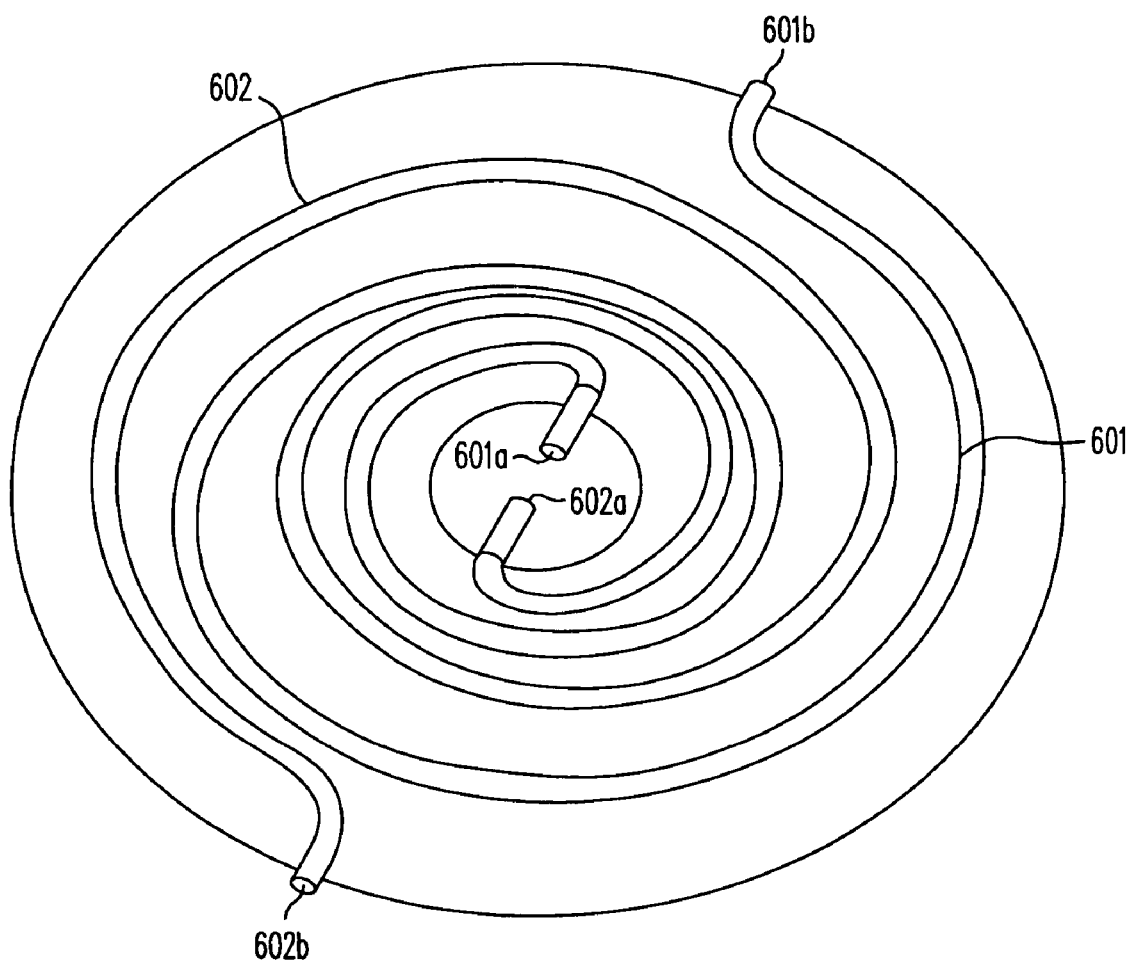
FIG. 6 is a top view showing spiral passages 601 and 602 in the portion of insulator layer 104 abutting cold zone 110b.

Insulator layer 104 may be filled with a thermally insulating material. FIG. 6 is a top view showing spiral passages 601 and 602 for cooling fluid in the portion of insulator layer 104 abutting cold zone 110b, according to one embodiment of the present invention. (Although only two passages are shown in FIG. 6, a practical implementation may have additional passages, depending on the cooling fluid flow rate desired, as discussed below). FIG. 6 shows the cooling fluid entering passages 601 and 602 at opening 601a and 602a, respectively, and passing into conduits at outlets 601b and 602b to return to cooling fluid capture 510 through passages within fluid guide structure 106 or through support structures in cold zone 110b. To achieve effective cooling in cold zone 110b, passages for cooling fluid may be provided between disk 108 and a fluid guide structure, dedicated conduits, passages along or embedded in the support structure, or a combination of structures in cold zone 110b. Generally, from threaded passage 501, the cooling fluid may flow radially towards the periphery and pass into cooling fluid capture 510. Many other schemes of distributing the cooling fluid throughout cold zone 110b are possible. According to one embodiment, support structures may be provided throughout insulator layer 104 for mechanical support to insulator layer 104.

The cooling fluid is preferably a fluid having a specific heat capacity much greater than the specific heat capacity of the working fluid. To maintain cold zone 110b at the preferred temperature, heat in the working fluid flowing into cold zone 110b must be dissipated by the cooling fluid and by housing 101. Efficiency of heat dissipation within housing 101 depends, for example, by the ability of fluid guides and blades of fluid guide structure 106 in cold zone 110b to conduct heat away from the working fluid they are in contact to housing 101. The heat in the working fluid in excess of the heat dissipated by housing 101 is dissipated by the cooling fluid. The angular speed at which the cylindrical enclosure rotates determines the pressure at which the cooling fluid is drawn into threaded passage 505a of rotary structure 111 and, thus the volume of the cooling fluid flowing into cold zone 110b. At higher energy input, the cylindrical enclosure rotates at a higher angular speed, thereby drawing a greater volume of cooling fluid per unit time, thus resulting in a greater cooling effect to maintain heat engine 100 within the desired operating temperature range. The lengths and the distribution of passages surrounding cold zone 110b depend on the volume of the cooling fluid required per unit time and the ability of cooling reservoir 107 to transfer the heat in the cooling fluid to the environment. If the passages are long, or if the volume of the cooling fluid flowing through the passages per unit time is low, the temperature difference between the cooling fluid in cooling reservoir 107 and the returning cooling fluid will be higher. Conversely, if the lengths of the passages are short, or if the volume of the cooling fluid flowing through the passages per unit time is high, the temperature difference between the cooling fluid in cooling reservoir 107 and the returning cooling fluid will be lesser. The lesser temperature difference is preferred. Conventional heat sinks may be provided on the outer wall of cooling reservoir 107 to dissipate the excess heat.

Figure 7:
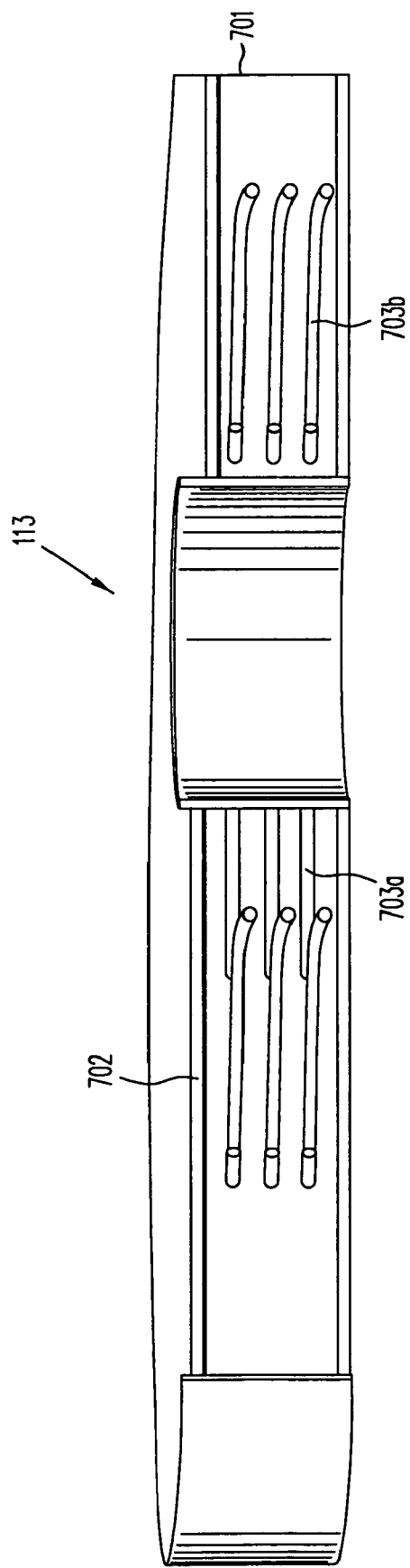
FIG. 7 shows a cross section view of heat reservoir 701, in accordance with one embodiment of the present invention.

As described above, an optional heat reservoir 701 may be provided at separator structure 105. Such a heat reservoir minimizes the fluctuation of power output even though the amount of heat provided by the heat source may fluctuate. Heat reservoir 701 also can retain heat and act as another heat source for heating up the working fluid after a primary heat source is no longer available. FIG. 7 shows a cross section view of heat reservoir 701, in accordance with one embodiment of the present invention. As shown in FIG. 7, heat reservoir 701 includes a cavity filled with a fluid of high specific heat capacity, and metallic plate 702 supported by springs 703a and 703b. The fluid in heat reservoir 701 may be pressurized, and should preferably remain liquid throughout the entire range of operating temperatures of heat engine 100. (Although only two springs are shown in FIG. 7, any number of springs may be used to support metallic plate 702.) Metal support structures (not shown) may be provided throughout heat reservoir 701 to both support the top and bottom walls of heat reservoir 701 and to conduct heat from hot zone 110a. Initially, the fluid in heat reservoir 701 is cold, and metallic plate 702 is not in contact with the bottom portion of hot zone 110a. As heat engine 100 operates, the temperature of the fluid in heat reservoir 701 rises. As a result, springs 703a and 703b expand to allow metallic plate 702 to contact the floor of hot zone 110a for greater surface area for heat transfer between hot zone 110a and the fluid in heat reservoir 701. According to one embodiment of the present invention, solid state materials or mixture of different types of materials can be used in heat reservoir 701. A heating mesh may also be used to facilitate heat transfer.

The above detailed description is provided to illustrate the specific embodiments of the present invention and is not intended to be limiting. Numerous modifications and variations with in the scope of the present invention are possible. The present invention is set forth in the following claims.

We claim:

1. A rotary engine, comprising:
   a housing including a chamber having, during operation, a first zone which receives energy from a heat source and a second zone which is maintained at a temperature that is lower than the temperature in the first zone;
   an insulator separating the first zone from the second zone;
   a first fluid provided within the chamber, the first fluid maintaining the same phase between the first zone and the second zone; and
   a set of blades within the chamber structurally adapted such that, an expansion or contraction of the first fluid acting on the set of blades sets the set of blades into non-oscillating motion;
   wherein the first fluid flows inside the chamber in an unenclosed channel, or a discontinuous, enclosed channel.

2. A rotary engine as in claim 1, further comprising fluid guides provided within the chamber for guiding a flow of the first fluid between the first zone and the second zone.

3. A rotary engine as in claim 1, wherein the first fluid comprises a gas.

4. A rotary engine as in claim 1, further comprising a one-way valve positioned between the first zone and the second zone to prevent back-flow of the first fluid from the first zone to the second zone.

5. A rotary engine as in claim 1, wherein a second fluid is circulated during operation between the second zone and a fluid source external to the housing.

6. A rotary engine as in claim 5, wherein the motion of the set of blades sets the housing into rotary motion, the rotary engine further comprising a member attached to the housing adapted for rotation about the axis of the rotary motion of the housing.

7. A rotary engine as in claim 6, wherein the member has a threaded passage for drawing the second fluid from the fluid source into the housing.

8. A rotary engine as in claim 6, wherein passages coupled to the member are provided throughout the second zone for distributing the second fluid drawn by the member.

9. A rotary engine as in claim 8, wherein one of the passages is provided as a spiral conduit in a portion of the insulation layer abutting the second zone.

10. A rotary engine as in claim 9, wherein one of the passages is provided between the housing and a surface of the second zone of the chamber allowing the second fluid to flow external to the housing.

11. A rotary engine as in claim 1, further comprising a heat storage structure located in the vicinity of the first zone.

12. A rotary engine as in claim 11, wherein the heat storage structure comprises a conductive plate adapted for heat transfer between the heat storage structure and the first zone.

13. A rotary engine as in claim 12, wherein the heat storage structure further comprises one or more springs loaded to urge the conductive plate into contact with the first zone as a result of a rise in temperature in the first zone.

14. A method for providing a rotary engine operating from a temperature difference, comprising:
   providing a chamber in a housing having, during operation, a first zone which receives energy from a heat source and a second zone which is maintained at a temperature that is lower than the temperature in the first zone;
   insulating the first zone from the second zone;
   providing a first fluid within the chamber; and maintaining the first fluid in the same phase between the first zone and the second zone;and
   providing a set of blades that is structurally adapted to be driven into a non-oscillating motion as a result of an expansion or contraction of the first fluid;
   wherein the first fluid flows inside the chamber in an unenclosed channel or a discontinuous, enclosed channel.

15. A method as in claim 14, further comprising providing fluid guides for guiding a flow of the first fluid between the first zone and the second zone.

16. A method as in claim 14, wherein the first fluid comprises a gas.

17. A method as in claim 14, further comprising providing a one-way valve to prevent back-flow of the first fluid from the first zone to the second zone.

18. A method as in claim 14, further comprising driving an axle into rotary motion by the rotary motion of the housing.

19. A method as in claim 14, further comprising circulating a second fluid during operation between the second zone and a reservoir external to the housing.

20. A method as in claim 19, wherein the motion of the set of blades sets the housing into a rotary motion, the method further comprising attaching to the housing a member which rotates about an axis of the rotary motion of the housing.

21. A method as in claim 20, further comprising providing a threaded passage in the member for drawing the second fluid into the housing.

22. A method as in claim 20, further comprising providing passages throughout the second zone to distribute the second fluid drawn by the member.

23. A method as in claim 22, wherein providing a spiral conduit as a passage for the second fluid in a portion of the insulation layer abutting the second zone.

24. A method as in claim 23, further comprising providing a passage between the housing and a surface of the second zone of the chamber.

25. A method as in claim 14, further comprising providing a heat storage structure located in the vicinity of the first zone.

26. A method as in claim 25, further comprising providing a conductive plate in the heat storage structure, the conductive plate being adapted for heat transfer between the heat storage structure and the first zone.

27. A method as in claim 26, further comprising providing one or more springs which are loaded to urge the conductive plate into contact with the first zone as a result of a rise in temperature in the first zone.

28. A rotary engine as in claim 1, wherein the motion of the set of blades rotates the first fluid.

29. A rotary engine as in claim 1, wherein the set of blades are located in the first zone.

30. A rotary engine as in claim 1, wherein the set of blades have internal conduits for fluid to flow through.

31. A rotary engine as in claim 1, wherein the set of blades is located between the first zone and the second zone.

32. A rotary engine as in claim 1, wherein the first fluid moves in a rotational motion between the first zone and the second zone.

33. A rotary engine as in claim 1, wherein the set of blades is located in the second zone.

34. A rotary engine as in claim 1, wherein the set of blades is coupled to the housing.

35. A rotary engine as in claim 34, further comprising an axle coupled to the housing and that provides mechanical output power.

36. A rotary engine as in claim 34, wherein the housing provides mechanical output power.

37. A rotary engine as in claim 5, wherein the fluid source is a reservoir.

38. A rotary engine as in claim 1, wherein the first fluid flows from the first zone to the second zone over a different path than from the second zone to the first zone.

39. A rotary engine as in claim 1, wherein the set of blades contains blades with asymmetric blade faces.

40. A rotary engine as in claim 1, wherein the set of blades contains impulse type blades.

41. A rotary engine as in claim 1, wherein the set of blades contains reaction type blades.

42. A rotary engine as in claim 1, wherein the set of blades accelerates the first fluid.

43. A rotary engine as in claim 1, wherein the set of blades creates torque.

44. A rotary engine as in claim 1, wherein the first fluid motion is by expansion and contraction.

45. A rotary engine as in claim 1, wherein the first fluid motion has linear velocity.

46. A rotary engine as in claim 1, wherein the first fluid motion creates pressure on the blades.

47. A rotary engine as in claim 1, wherein the first fluid path rotates about an axis between the first zone and the second zone.

48. A rotary engine as in claim 42, wherein the first fluid flows in parallel with the set of blades are parallel to the first fluid flow.

49. A rotary engine as in claim 1, wherein the set of blades control a pressure in the first fluid.

50. A rotary engine as in claim 1, wherein the set of blades are coupled to an internal wall detached from an interior wall of the housing.

51. A rotary engine as in claim 1, wherein the first set of blades create a torque from the motion of the first fluid.

52. A rotary engine as in claim 1, wherein the first fluid has a continuous fluid flow.

53. A rotary engine as in claim 1, wherein the momentum of the first fluid at the end of an engine cycle is substantially utilized at the beginning of a next engine cycle.

54. A rotary engine as in claim 1, wherein the set of blades perform multiple functions.

55. A rotary engine as in claim 1, wherein the set of blades are coupled through a heat exchange to a heat source or a cooling source.

56. A rotary engine as in claim 1, wherein the set of blades increases a size of the heating or cooling surface.

57. A rotary engine as in claim 1, wherein the set of blades create channels for the first fluid to circulate.

58. A rotary engine as in claim 2, wherein the fluid guides are positioned to direct the first fluid flow in a direction to the set of blades to increase the torque created by the first set of blades.

59. A rotary engine as in claim 1, wherein spaces exist between the first zone and the second zone.

60. A rotary engine as in claim 1, wherein faces of the set of blades are bathed in the first fluid.

61. A heat engine, comprising:
a heat source;
a chamber including a working fluid and having a first zone and a second zone maintained at a temperature difference;
an insulator adapted to maintain the temperature difference; and
a heat storage device within the chamber that receives heat from the heat source.

62. A heat engine as in claim 61, wherein the heat storage device includes an expansion mechanism which expands when the temperature of the first fluid increases and contracts when the temperature of the first fluid decreases.

63. A heat engine as in claim 62, further comprising springs in the expansion mechanism to provide the expansion and the contraction.

64. A heat engine as in claim 62, wherein the expansion mechanism includes a thermal coupling structure which allows heat to transfer from the heat storage device to the first zone up to a predetermined temperature.

65. A heat engine as in claim 64, wherein the thermal coupling structure includes a thermal conductive plate.

66. A heat engine as in claim 61, wherein the heat storage device is a heat source.

67. A heat engine as in claim 61, wherein the heat storage device includes a reservoir containing a second fluid for heat storage.

68. A heat engine as in claim 61, further comprising a set of fluid guides.

69. A beat engine as in claim 68, wherein the set of fluid guides creates torque from a fluid flow of the working fluid.

70. A heat engine as in claim 68, wherein the fluid guides are coupled through a heat exchange to the heat storage device.

71. A heat engine as in claim 61, wherein the working fluid flows by expansion or contraction due to the temperature difference between the first zone and the second zone.

72. A method for providing a heat engine, comprising:
providing a heat source and a chamber including a working fluid and having a first zone and a second zone maintained at a temperature difference;
providing a first thermal structure adapted to maintain the temperature difference;
providing a beat storage device within chamber that receives heat from the heat source.

73. A method as in claim 72, wherein the heat storage device includes an expansion mechanism such that expands when the temperature of the first fluid increases and contracts when the temperature of the first fluid decreases.

74. A method as in claim 73, further comprising providing springs in the expansion mechanism for expansion and contraction.

75. A method as in claim 73, wherein the expansion mechanism includes a thermal coupling structure allowing heat to transfer from the heat storage device to the first zone at a predetermined temperature of the heat storage device.

76. A method as in claim 72, wherein the heat storage device includes a heat source.

77. A method as in claim 72, wherein the heat storage device includes a reservoir containing a second fluid for heat storage.

78. A method as in claim 72, further comprising providing a set of fluid guides.

79. A method as in claim 75, wherein the thermal coupling structure includes a thermal conductive plate.

80. A method as in claim 78, wherein the set of fluid guides creates torque from a fluid flow of the working fluid.

81. A method as in claim 78, wherein the fluid guides are coupled through a heat exchange to the heat storage device.

82. A method as in claim 72, wherein the working fluid flows by expansion or contraction from the temperature difference between the first zone and the second zone.

83. A rotary engine, comprising:
a rotational output device and a chamber including a working fluid and having a first zone and a second zone maintained at a temperature difference; and
an insulator adapted to maintain the temperature difference;
an external fluid source external to the chamber that includes an external fluid;
a flow control structure that controls a fluid flow of the external fluid between the external fluid source and the chamber, the fluid control structure being structurally adapted such that a rotational motion of the rotational output device determines the fluid flow.

84. A rotary engine as in claim 83, wherein the flow control structure includes threaded passages.

85. A rotary engine as in claim 83, wherein the flow control structure moves fluid into the chamber.

86. A rotary engine as in claim 83, wherein the external fluid source includes a reservoir.

87. A rotary engine as in claim 83, further comprising a set of fluid guides.

88. A rotary engine as in claim 87, wherein the set of fluid guides creates torque.

89. A rotary engine as in claim 87, wherein the set of fluid guides include internal conduits that are coupled to the fluid control structure and in which the external fluid flows.

90. A rotary engine as in claim 83, wherein the external fluid is a cooling fluid.

91. A rotary engine as in claim 83, wherein the rotational output device includes walls of the chamber.

92. A rotary engine as in claim 83, further comprising a set of passages in the first zone coupled to the flow control structure, wherein the external fluid flows through the set of passages.

93. A rotary engine as in claim 92, further comprising a second set of conduits coupled to the set of passages that allow the external fluid to flow external to the chamber.

94. A rotary engine as in claim 93, wherein the second set of conduits allow the external fluid to flow between the chamber and the external fluid source.

95. A rotary engine as in claim 94, wherein the external fluid flows outward from the chamber through the second set of conduits.

96. A method for providing a rotary engine, comprising:
   providing a rotational output device and a chamber including a working fluid and having a first zone and a second zone maintained at a temperature difference; and
   providing an insulator adapted to maintain the temperature difference;
   providing an external fluid source external to the chamber that includes an external fluid;
   providing a flow control structure that controls the fluid flow of the external fluid between the external fluid source and the chamber, the flow control structure being structurally adapted such that a rotating speed of the rotational output device determines the fluid flow.

97. A method as in claim 96, wherein the flow control structure includes threaded passages.

98. A method as in claim 96, wherein the flow control structure moves fluid into the chamber.

99. A method as in claim 96, wherein the external fluid source includes a reservoir.

100. A method as in claim 96, further comprising providing a set of fluid guides.

101. A method as in claim 100, wherein the set of fluid guides creates torque.

102. A method as in claim 100, wherein the set of fluid guides includes internal conduits coupled to the fluid control structure and in which the external fluid flows.

103. A method as in claim 96, wherein the external fluid includes a cooling fluid.

104. A method as in claim 96, wherein the rotational output device includes walls of the chamber.

105. A method as in claim 96, further comprising providing a set of passages in the first zone coupled to the flow control structure and in which the external fluid flows.

106. A method as in claim 105, further comprising providing a second set of conduits coupled to the first set of passages that allow the external fluid to flow external to the chamber.

107. A method as in claim 106, wherein the second set of conduits allow the external fluid to flow between the chamber and the external fluid source.

108. A method as in claim 107, wherein the external fluid flows outward from the chamber through the second set of conduits.

109. A method as in claim 14, wherein the set of blades are provided in one or more of the following locations: the first zone, the second zone and between the first zone and the second zone.

110. A method as in claim 14, wherein the set of blades are coupled to the housing.

111. A method as in claim 110, wherein the housing provides mechanical output power.

* * * * *